United States Patent
Xia et al.

(10) Patent No.: US 12,475,010 B1
(45) Date of Patent: Nov. 18, 2025

(54) HIGH-TEMPORAL-ACCURACY POWER GLITCH FAULT INJECTION METHOD AND APPARATUS FOR CRYPTOGRAPHIC CHIP

(71) Applicants: CHINA AUTOMOTIVE TECHNOLOGY AND RESEARCH CENTER CO., LTD., Tianjin (CN); CHINA AUTOMOTIVE CHIP (SHENZHEN) TECHNOLOGY CO., LTD., Shenzhen (CN)

(72) Inventors: Xianzhao Xia, Tianjin (CN); Yuning Li, Tianjin (CN); Mingyang Li, Tianjin (CN); Yujia Li, Tianjin (CN); Yaozong Xu, Tianjin (CN); Rui Zhao, Tianjin (CN); Ruiqing Zhai, Tianjin (CN); Mingkai Yan, Tianjin (CN); Changqing Dong, Tianjin (CN); Hui Rong, Tianjin (CN); Lixiong Zhang, Tianjin (CN)

(73) Assignees: CHINA AUTOMOTIVE TECHNOLOGY AND RESEARCH CENTER CO., LTD., Tianjin (CN); CHINA AUTOMOTIVE CHIP (SHENZHEN) TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/006,193

(22) Filed: Dec. 30, 2024

(30) Foreign Application Priority Data

Sep. 3, 2024 (CN) .......................... 202411225117.X

(51) Int. Cl.
*G06F 11/26* (2006.01)
*G06F 11/277* (2006.01)

(52) U.S. Cl.
CPC .......... *G06F 11/261* (2013.01); *G06F 11/277* (2013.01)

(58) Field of Classification Search
CPC ............................ G06F 11/261; G06F 11/277
See application file for complete search history.

(56) References Cited

U.S. PATENT DOCUMENTS

| 12,204,685 B2 * | 1/2025 | Tehranipoor ........ G06F 30/3308 |
| 2021/0349990 A1 | 11/2021 | Cosaro et al. |

FOREIGN PATENT DOCUMENTS

| CN | 116388959 A | 7/2023 |

OTHER PUBLICATIONS

Wu et al. Fault Template Attack Based On Fault Probability IEEE Access, Digital Object Identifier, vol. 11, 2023 (Year: 2023).*
Bozzato et al. Shaping the Glitch: Optimizing Voltage Fault Injection Attacks IACR Transaction on Cryptographic Hardware and Embedded Systems, vol. 2019, No. 2, pp. 199-224 (Year: 2019).*

(Continued)

*Primary Examiner* — Rehana Perveen
*Assistant Examiner* — Cuong V Luu
(74) *Attorney, Agent, or Firm* — Westbridge IP LLC

(57) ABSTRACT

Disclosed in the present application are a high-temporal-accuracy power glitch fault injection method and apparatus for a cryptographic chip. According to the method, power glitch fault injection time is adjusted by considering rise time of a power glitch fault, so that the power glitch fault injection time is controlled more accurately, the limitation of the power glitch fault injection in temporal accuracy is reduced, and the success rate of the power glitch fault injection is increased.

4 Claims, 3 Drawing Sheets

(56) References Cited

OTHER PUBLICATIONS

Yuce et al. Fault Attacks on Secure Embedded Software: Threats, Design and Evaluation J Hardw Syst Secur 2, 2018 (Year: 2018).*
First Office Action issued in counterpart Chinese Patent Application No. 202411225117.X, dated Oct. 12, 2024.

* cited by examiner

HIGH-TEMPORAL-ACCURACY POWER GLITCH FAULT INJECTION METHOD AND APPARATUS FOR CRYPTOGRAPHIC CHIP

CROSS-REFERENCE TO RELATED APPLICATIONS

This application claims priority to Chinese Patent Application No. 202411225117.X, filed on Sep. 3, 2024, the content of which is incorporated herein by reference in its entirety.

TECHNICAL FIELD

The present application relates to the technical fields of integrated circuit safety and power glitch fault injection, and in particular to a high-temporal-accuracy power glitch fault injection method and apparatus for a cryptographic chip.

BACKGROUND

Attacks against a cryptographic chip are mainly divided into two types: a side channel attack and a fault injection attack. Many different fault injection technologies are proposed in existing literatures, such as power fault injection, laser injection, clock glitch and electromagnetic pulse.

A power fault injection technology is a method for performing fault injection by adjusting a power supply during operation of an integrated circuit. Early tampering of a power voltage is to inject faults into a target device through underfeeding. The power voltage lower than a standard voltage will increase the delay of a combined path. When the voltage is reduced to enable a path delay to be longer than a clock cycle, setup time will be violated, resulting in errors, for example, data of a hardware circuit is modified or an instruction of a microcontroller is skipped. However, since all clock cycles are exposed to a low voltage, this technology cannot control the fault injection time. The resulting improvement is power glitch fault injection. A timely peak is inserted into a power cord or a fault is injected through temporary power failure. Since it is necessary to control the time of controlling the peak, the power glitch fault injection is time-sensitive. The power glitch fault injection technology will not leave tampering traces, and similar to clock glitch fault injection, is non-invasive.

After fault injection is implemented, the attacker can extract circuit key information by using the injected fault and through differential fault analysis (DFA). DFA gradually deduces a key used in an encryption algorithm by comparing a correct ciphertext with an incorrect ciphertext (that is, a ciphertext obtained from incorrect encryption). The accuracy of DFA is related to the accuracy of the fault injection. The fault injection is time-sensitive. If a fault is not induced at an appropriate time in the algorithm or an incorrect spatial position is affected, the whole attack process fails. Therefore, temporal accuracy is a key factor for performing any fault attack.

In the practical application of the power glitch fault injection, the existing research has a great limitation in the injected temporal accuracy when adopting a power glitch-based fault injection mode. The power glitch-based fault injection mode is to insert a peak value in a clock power supply and destroy a timing constraint of the circuit to cause the chip to skip an instruction so as to generate a fault. Considering an experimental apparatus of power glitch fault injection and the inherent property of an electric signal, signal rise time will be necessarily experienced when the peak value is inserted into the clock power supply. However, after extensive investigation, the existing research only considers the duration of the power glitch, but has not considered the influence on the generation of the power glitch fault by the signal rise time. There is no effective method to solve the above problem of failure of power glitch fault injection attack caused by insufficient temporal accuracy.

Therefore, there is an urgent need for a high-temporal-accuracy power glitch fault injection method and apparatus for a cryptographic chip, which can control the injection time point more accurately when the cryptographic chip is subjected to power glitch fault injection, thereby improving the analysis efficiency and effect of differential fault analysis and increasing the success rate of effective fault injection.

SUMMARY

To solve the above technical problems, the present application provides a high-temporal-accuracy power glitch fault injection method and apparatus for a cryptographic chip, which can control the injection time point more accurately when the cryptographic chip is subjected to power glitch fault injection, thereby improving the analysis efficiency and effect of differential fault analysis and increasing the success rate of effective fault injection.

The present application provides a high-temporal-accuracy power glitch fault injection method for a cryptographic chip, including the following steps:

the high-temporal-accuracy power glitch fault injection method for the cryptographic chip is used for a safety test of the cryptographic chip and implemented based on a power glitch fault injection apparatus which includes a computer, a high-voltage pulse generator and a circuit board, and includes the following steps:

setting parameters of the power glitch fault injection apparatus, wherein the parameters specifically comprise:

a power voltage: controlling the circuit board by the computer to set the power voltage according to a voltage required for the normal operation of a circuit of a cryptographic chip to be tested, a power glitch voltage: controlling the high-voltage pulse generator by the computer to set the glitch voltage according to the power voltage, and a power glitch length: controlling the high-voltage pulse generator by the computer to set the power glitch length according to the power voltage;

performing initialized configuration on the cryptographic chip to be tested by the computer, comprising: power-on and plaintext input;

determining power glitch fault injection time according to the power glitch voltage and a target instruction, specifically comprising: determining rise time of a power glitch fault according to the power glitch voltage, determining a peak moment of the power glitch fault according to the target instruction, and taking a difference value between the peak moment of the power glitch fault and the rise time of the power glitch fault as single power glitch fault injection time;

setting the power glitch fault injection time by the computer, and controlling the high-voltage pulse generator to generate the power glitch fault;

injecting the power glitch fault into the cryptographic chip to be tested, determining whether the injection is an effective injection, recording an incorrect ciphertext generated by the injection as an effective incorrect ciphertext if the injection is the effective injection, otherwise, skipping recording, wherein the power glitch fault injection comprises: a single power glitch fault injection and a continuous power glitch fault injection;

after completing one fault injection by the power glitch fault injection apparatus, returning to the step of setting the parameters of the power glitch fault injection apparatus, and re-performing power glitch fault injection until preset fault injection times are reached, and obtaining effective incorrect ciphertexts generated when the cryptographic chip to be tested inputs different plaintexts; and analyzing the effective incorrect ciphertexts according to a differential fault and cracking key information of the cryptographic chip to be tested to complete the safety test of the cryptographic chip.

Based on the same inventive concept, the present application further provides a power glitch fault injection apparatus, for implementing the above high-temporal-accuracy power glitch fault injection method for the cryptographic chip, and including:

a computer, connected to a high-voltage pulse generator, a circuit board and a cryptographic chip to be tested through a serial cable, and configured to control the high-voltage pulse generator to input a power glitch fault, control a power voltage of the circuit board and control the initialization of the cryptographic chip to be tested;

the high-voltage pulse generator, connected to the computer, connected to a chip to be tested through a dedicated high-voltage cable, and configured to generate the power glitch fault so as to generate the power glitch fault in the cryptographic chip to be tested; and a circuit board, connected to the computer, connected to the high-voltage pulse generator through a dedicated high-voltage cable, and configured to provide a power voltage required by the cryptographic chip to be tested.

The embodiments of the present application have the following technical effects.

According to the present application, power glitch fault injection time is adjusted by considering rise time of a power glitch fault, so that the power glitch fault injection time is controlled more accurately, the limitation of the power glitch fault injection in temporal accuracy is reduced, and the success rate of the power glitch fault injection is increased. Meanwhile, the rise time is adjusted in time according to the influence of a power glitch injection intensity on a glitch rise slope, thereby ensuring the accuracy of the power glitch fault injection time. During continuous power glitch fault injection, the injection cycle is adjusted according to the rise time and fall time of the power glitch fault, thereby ensuring the accuracy of the continuous power glitch fault injection time.

The cryptographic chip to be tested is subjected to power glitch fault injection many times, the fault injection that successfully skips the target instruction is regarded as the effective injection, the incorrect ciphertexts output by the same key under different input plaintexts are collected, and the key information of the cryptographic chip is cracked by the differential fault analysis. This technology is helpful for cryptographic chip designers to improve protection measures in time for the power glitch fault injection and enhance the safety of the chip.

BRIEF DESCRIPTION OF THE DRAWINGS

To more clearly describe the technical solutions of the specific embodiments of the present application or in the prior art, the accompanying drawings required to describe the specific embodiments or the prior art are briefly described below. Apparently, the accompanying drawings described below are some embodiments of the present application. Those of ordinary skill in the art may further obtain other accompanying drawings based on these accompanying drawings without inventive effort.

DETAILED DESCRIPTION OF THE EMBODIMENTS

To make the objective, technical solutions and advantages of the embodiments of the present application clearer, the technical solutions of the present application will be clearly and completely described below. Apparently, the embodiments described are merely some embodiments rather than all embodiments of the present application. Based on the embodiments of the present application, all other embodiments obtained by those of ordinary skill in the art without creative efforts shall fall within the protection scope of the present application.

In a traditional power glitch fault injection method, the duration of a power glitch is only considered usually, the influence of signal rise time on the generation of a power glitch fault has not been considered, and the effectiveness is often limited by temporal accuracy.

To overcome this problem, the present application considers the rise time of the power glitch, thereby accurately controlling the power glitch fault injection time. According to the present application, through the high-accuracy time adjustment, the injection time point can be controlled more accurately when a cryptographic chip is subjected to power glitch fault injection, so that the accuracy and the success rate of the fault injection are significantly improved. This adjustment strategy of accurately controlling the fault injection time by combining with the rise time of the power glitch enables the fault injection technology to act on a target cryptographic chip more accurately and efficiently, thereby providing a more effective technical means for the safety evaluation of the cryptographic chip and the improvement of the protection measures. By the method of the present application, the electromagnetic fault injection of the cryptographic chip can be implemented with higher accuracy within less test times, thereby greatly improving the efficiency and quality of the safety test.

Figure 2:
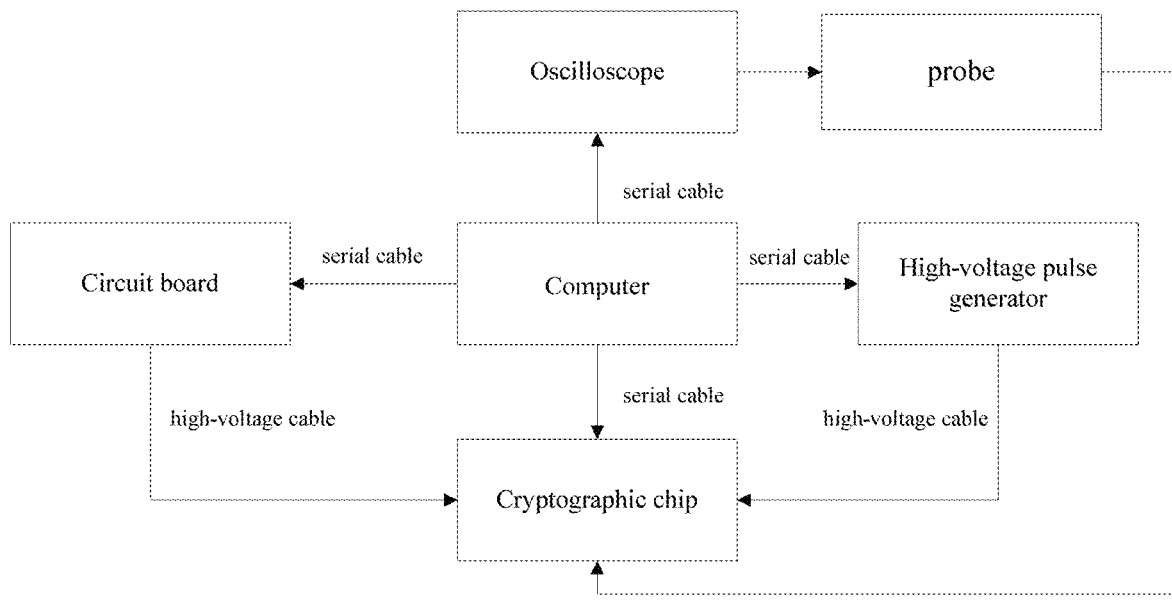
FIG. 2 is a schematic diagram of a high-temporal-accuracy power glitch fault injection apparatus for a cryptographic chip according to an embodiment of the present application.

FIG. 2 is a schematic diagram of a power glitch fault injection apparatus according to an embodiment of the present application. Referring to FIG. 2, the power glitch fault injection apparatus specifically includes: a computer, a high-voltage pulse generator, a circuit board and an oscilloscope.

Further, the computer is connected to a high-voltage pulse generator, a circuit board and a cryptographic chip to be tested through a serial cable, and configured to control the high-voltage pulse generator to input a power glitch fault, control a power voltage of the circuit board and control the initialization of the cryptographic chip to be tested;

the high-voltage pulse generator is connected to the computer, connected to a chip to be tested through a dedicated high-voltage cable, and configured to generate the power glitch fault so as to generate the power glitch fault in the cryptographic chip to be tested;

the circuit board is connected to the computer, connected to the high-voltage pulse generator through a dedicated high-voltage cable, and configured to provide a power voltage required by the cryptographic chip to be tested; and an oscilloscope: connected to the computer, connected to the cryptographic chip to be tested through a probe, and configured to detect an electromagnetic signal of the cryptographic chip to be tested, monitor a fault injection time point and detect a waveform fluctuation of the cryptographic chip to be tested so as to preliminarily determine whether fault injection is completed successfully.

Specifically, the computer is connected to the high-voltage pulse generator, the circuit board and the cryptographic chip to be tested through a serial cable; the computer is configured to control the whole experimental process and control the high-voltage pulse generator to generate a preset power glitch fault mode, control the power voltage of the circuit board to ensure that the cryptographic chip to be tested works within a correct voltage range, and control the initialization process of the cryptographic chip to be tested to ensure that the chip is in an expected state at the beginning of the experiment; and the high-voltage pulse generator is connected to a cryptographic chip to be attacked through a dedicated high-voltage cable. The high-voltage pulse generator is responsible for generating a power glitch fault signal; these power glitches will be transmitted to a power pin of the cryptographic chip to be tested through a connected cable to simulate the unstable situation of the power supply under electromagnetic interference; and the circuit board is connected to the computer and the high-voltage pulse generator through the dedicated high-voltage cable. The circuit board provides a stable power voltage required by the cryptographic chip to be tested to ensure that the circuit board can effectively transmit the power glitch generated by the high-voltage pulse generator to the cryptographic chip to be tested and protect other circuits from unnecessary interference or damage; and the oscilloscope is connected to the computer and connected to the cryptographic chip to be tested through a probe. The oscilloscope is configured to monitor the reaction of the cryptographic chip to be tested and the electromagnetic signal in the experiment, detect the time point in the fault injection process to ensure that the fault is injected at the correct time point, and analyze the waveform fluctuation of the cryptographic chip to be tested so as to preliminary determine whether the fault injection is completed successfully.

Further, the circuit board is required to disconnect the power supply and remove a capacitor on the circuit board. Specifically, the circuit board is powered off, so that the power glitch fault injection apparatus can control the power supply of the cryptographic chip to be tested; and all capacitors for stabilizing signals on the circuit board are removed to reduce the total capacitance in a core power domain, thereby reducing the energy storage capacity of a power supply system and better completing the power glitch fault injection.

Figure 1:
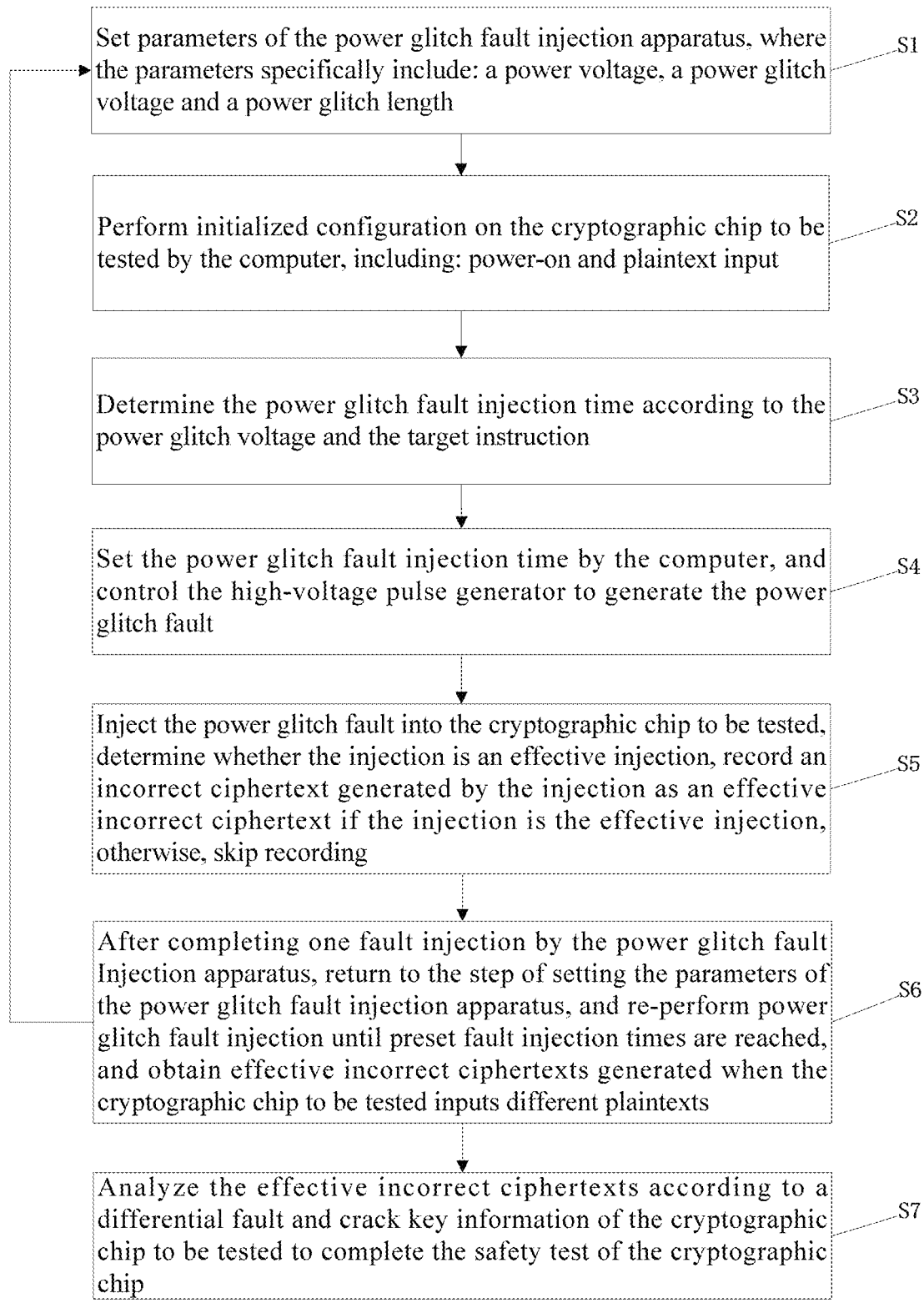
FIG. 1 is a flowchart of a high-temporal-accuracy power glitch fault injection method for a cryptographic chip according to an embodiment of the present application.

FIG. 1 is a flowchart of a high-temporal-accuracy power glitch fault injection method for a cryptographic chip according to an embodiment of the present application. Referring to FIG. 1, the method specifically includes;

S1: parameters of the power glitch fault injection apparatus are set, where the parameters specifically include:

a power voltage: controlling the circuit board by the computer to set the power voltage according to a voltage required for the normal operation of a circuit of a cryptographic chip to be tested, Specifically, a power voltage required for the normal operation of the cryptographic chip to be tested is determined, and a corresponding instruction is input through a communication interface between the computer and the circuit board to set a power voltage output by the circuit board so as to ensure that the power voltage meets the working requirement of the cryptographic chip.

a power glitch voltage: controlling the high-voltage pulse generator by the computer to set the glitch voltage according to the power voltage, and Specifically, the high-voltage pulse generator is controlled by the computer according to the required fault injection intensity, and a voltage value when the power glitch is generated is set, where the voltage value should be lower than the power voltage so as to simulate the power fault situation.

a power glitch length: controlling the high-voltage pulse generator by the computer to set the power glitch length according to the power voltage;

Specifically, the length of the power glitch refers to a duration after the glitch occurs. The high-voltage pulse generator is controlled by the computer to set the duration of the power glitch, and further adjustment is performed according to the power voltage.

S2: initialized configuration is performed on the cryptographic chip to be tested by the computer, including: power-on and plaintext input.

Further, a correct ciphertext of the cryptographic chip to be tested is obtained, that is, a ciphertext output by the cryptographic chip to be tested under the condition of no fault attack.

S3: the power glitch fault injection time is determined according to the power glitch voltage and the target instruction.

Further, the rise time of the power glitch fault is determined according to the power glitch voltage;

a peak moment of the power glitch fault is determined according to the target instruction; and a difference value between the peak moment of the power glitch fault and the rise time of the power glitch fault is taken as single power glitch fault injection time.

Figure 3:
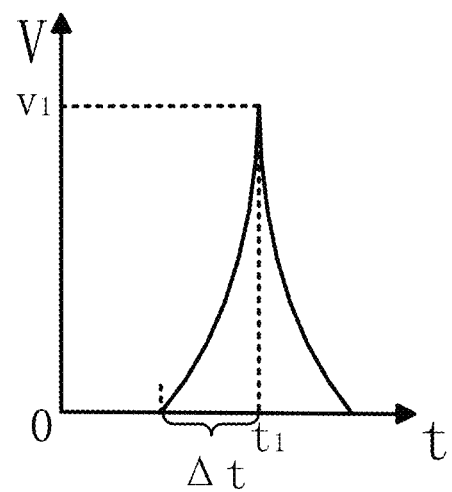
FIG. 3 is a schematic diagram of power glitch fault injection time according to an embodiment of the present application.

Specifically, according to the traditional fault injection method, the peak moment $t_1$ of the power glitch fault is set as the power glitch fault injection time, but the high-temporal-accuracy power glitch fault injection method for the cryptographic chip provided by the present application considers the rise time of the power glitch on the power cord to accurately control the power glitch fault injection time. FIG. 3 is a schematic diagram of power glitch fault injection time according to an embodiment of the present application. As shown in FIG. 3, for the peak moment $t_1$ of the power glitch fault and the rise time of the power glitch obtained according to the power voltage, the power glitch fault injection time is a difference value between the peak moment of the power glitch fault and the rise time of the power glitch fault, that is, $t_1-\Delta t$.

Figure 4:
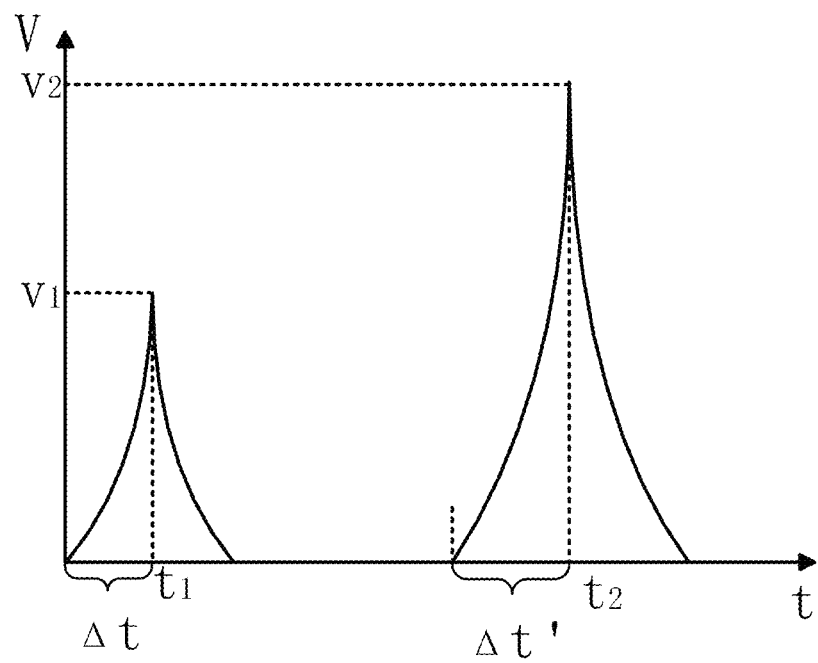
FIG. 4 is a schematic diagram of power glitch fault injection time with different power glitch fault injection intensities according to an embodiment of the present application.

Further, FIG. 4 is a schematic diagram of power glitch fault injection time with different power glitch fault injection intensities according to an embodiment of the present application. As shown in FIG. 4, for different power glitch fault injection intensities, the peak time of the power glitch fault, the rise slope of the power glitch fault and the rise time of the power glitch fault will change, and it is necessary to adjust $\Delta t$ as $\Delta t'$ in real time according to the rise time when the power glitch fault reaches the peak of the power glitch fault, so that the power glitch fault injection time is adjusted as $t_2-\Delta t'$.

This step is very important for accurately simulating the influence of the power glitch fault on the cryptographic chip, and the accurate influence of the actual power glitch fault on the cryptographic chip timing can be simulated by accurately determining the power glitch fault injection time; performing power glitch fault injection for a specific target instruction can study the cryptographic chip behavior under a specific operation and provide basis for analyzing and improving the specific weakness of the chip; and controlling the rise time and the peak moment of the power glitch fault can simulate the power glitch fault with different severities and evaluate the sensitivity of the cryptographic chip to different fault conditions.

S4: the power glitch fault injection time is set by the computer, and the high-voltage pulse generator is controlled to generate the power glitch fault.

Specifically, accurate power glitch fault injection time is input by computer software, and the fault injection is based on the rise time and the peak moment of the power glitch determined in advance.

S5: the power glitch fault is injected into the cryptographic chip to be tested, whether the injection is an effective injection is determined, an incorrect ciphertext generated by the injection is recorded as an effective incorrect ciphertext if the injection is the effective injection, otherwise, recording is skipped.

Specifically, the power glitch fault is injected into the cryptographic chip to be tested, whether the cryptographic chip to be tested outputs an incorrect ciphertext skipping the target instruction is determined, it is determined that the injection is the effective injection if the incorrect ciphertext skipping the target instruction is output, otherwise, the injection is a non-effective injection.

Further, the principle of target instruction skipping caused by the power glitch fault injection is as follows: when a power cord in a digital circuit suffers from the glitch fault of instantaneous voltage reduction, the power volume may be reduced to be lower than a voltage level required for the normal work of the circuit; the reduction of the power voltage will prolong the propagation delay of signals in the circuit, especially on a combinational logic path; if the delay caused by the power glitch is increased to a critical level, so that the signal cannot reach a stable state within the setup time of the clock cycle, the setup time violation will occur; at this time, a register in the circuit may not capture a correct input signal on a clock sampling edge, resulting in that the output cannot be updated correctly, so that the target instruction expectedly executed within the clock cycle is ignored or skipped; since the logic operation of the digital circuit depends on accurate clock synchronization, any timing violation may cause an operational error or abnormal logic state, which not only affects the normal function of the circuit, but also may expose security loopholes; therefore, the power glitch fault injection is an effective test means, for evaluating the sensitivity of the circuit to the power fluctuation and the ability of resisting potential attacks.

The power glitch fault injection includes: a single power glitch fault injection and a continuous power glitch fault injection.

Further, during the continuous power glitch fault injection, after the step S4, the method further includes: the injection time of the power glitch fault is determined according to the power glitch voltage and the target instruction.

Specifically, the fall time of the power glitch fault is determined according to the power glitch voltage.

summing the rise time of the power glitch fault, the fall time of the power glitch fault and preset signal delay time to serve as a continuous fault injection cycle.

Figure 5:
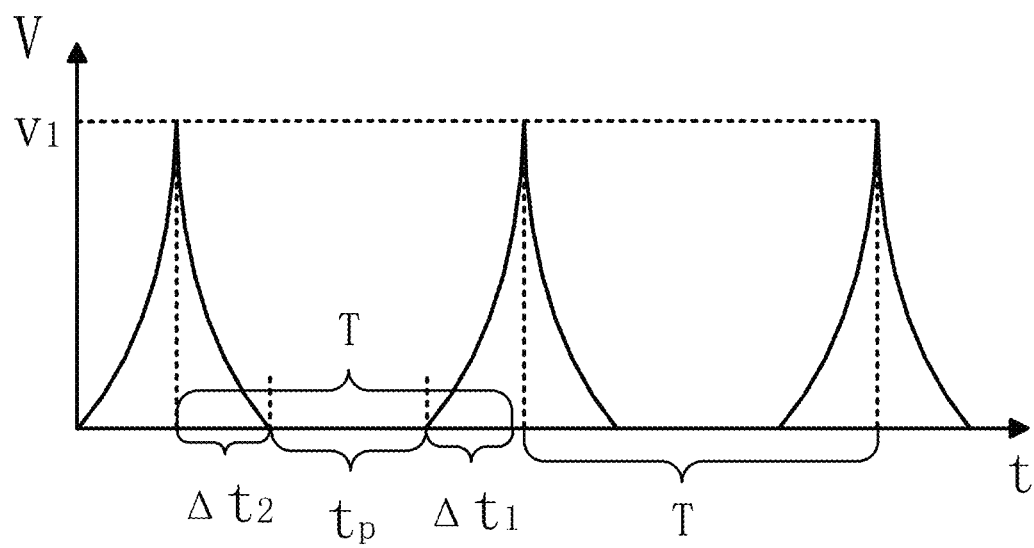
FIG. 5 is a schematic diagram of a continuous fault injection cycle of continuous power glitch fault injection according to an embodiment of the present application.

FIG. 5 is a schematic diagram of a continuous fault injection cycle of continuous power glitch fault injection according to an embodiment of the present application. As shown in FIG. 5, the continuous power glitch fault injection is required to set a reasonable continuous fault injection cycle for the power glitch fault injection; the traditional fault injection method usually sets the continuous fault injection cycle as signal delay time $t_p$ during the continuous fault injection; and the high-temporal-accuracy power glitch fault injection method for the cryptographic chip provided by the present application considers the rise time $\Delta t_1$ of the power glitch fault and the fall time $\Delta t_2$ of the power glitch fault and adjusts the continuously fault injection cycle as $T=\Delta t_1+\Delta t_2+t_p$, so that the fault injection time is more accurate.

S6: after one fault injection is completed by the power glitch fault injection apparatus, the step S1 is returned and re-performed until preset fault injection times are reached, and effective incorrect ciphertexts generated when the cryptographic chip to be tested inputs different plaintexts are obtained.

S7: the effective incorrect ciphertexts are analyzed according to a differential fault analysis algorithm and key information of the cryptographic chip to be tested is cracked.

Further, a difference set is calculated according to a correct ciphertext output by cryptographic chip to be tested under a certain plaintext and an effective incorrect ciphertext output by the cryptographic chip to be tested under the plaintext;

the above step is repeated to obtain all difference sets of cryptographic chip to be tested under different plaintexts;

calculating an intersection according to all the difference sets; and determining the key information of the cryptographic chip to be tested according to the intersection.

The differential fault analysis (DFA) algorithm, as a mature technology, has been widely applied to the safety analysis and key cracking of the cryptographic chip. DFA can effectively infer an encrypted key by performing deep analysis on the ciphertext difference caused by a minor fault introduced in the encryption process. This technology uses the characteristic of significant change of the ciphertext caused by slight change of the plaintext in the encryption algorithm to gradually reveal the key information by comparing an output difference between a fault and a normal execution. Due to the extensive application and deep research of the DFA algorithm in the field of cryptanalysis, the theory and the practical method are quite mature, so the present application does not explain the DFA algorithm in detail.

Further, the effective fault injection success rate is defined as: the proportion of the effective fault injection times that successfully causes the cryptographic chip to generate exploitable errors in the all attempted fault injections, which can serve as an index for measuring the effectiveness of the fault injection method, expressed by the formula:

$$ISR(f) = \frac{n}{N},$$

where n is the number of times of effective fault injections, that is the number of times of outputting the effective incorrect ciphertexts by the cryptographic chip caused by fault injection; N is the total number of times of fault injections, that is, the total number of times of attempting to inject the fault; and ISR(f) is the effective fault injection success rate.

The higher ISR(f) is, the more effective the high-temporal-accuracy power glitch fault injection method for the cryptographic chip is. The high-temporal-accuracy power glitch fault injection method for the cryptographic chip can be evaluated in combination with the effect of the differential fault analysis and the success rate of the effective fault injection.

In view of the power glitch fault injection attack of the cryptographic chip, the present application provides a high-temporal-accuracy power glitch fault injection method for a cryptographic chip. Considering that the power glitch fault has rise time and cannot reach a peak value immediately, the cryptographic chip to be tested is attacked only when the power glitch fault reaches the peak value, the intensities during the power glitch fault injection are different, and the rise slope and the rise time of the power glitch fault are also different. Therefore, according to the present application, the power glitch fault injection time is adjusted according to the peak time and the rise time of the power glitch fault, so that the injection time is controlled more accurately, the accuracy of controlling the injection time is enhanced, the analysis efficiency and effect of the differential fault analysis are improved, and the success rate of the effective fault injection is increased. In addition, during the continuous fault injection, the present application further considers the rise time and the fall time of the power glitch fault, and the fault injection cycle is adjusted jointly according to the rise time, the fall time and the signal delay time of the power glitch fault, so that the accuracy of controlling the injection time is further enhanced, the analysis efficiency and effect of the differential fault analysis are improved, the success rate of the effective fault injection is increased, and it is helpful for cryptographic chip designers to improve protection measures for the power glitch fault injection and enhance the safety of the chip.

It should be noted that the terms used in the present application are merely for describing specific embodiments, rather than limiting the embodiments of the present application. As shown in the specification of the present application, unless the context clearly suggests an exception, the words such as "a", "an", "one" and/or "the" do not refer to the singular, or may include the plural. The terms "including", "comprising" or other variations thereof are intended to cover non-exclusive inclusion, so that a process, method or device including a series of elements not only includes those elements, but also includes other elements not explicitly listed, or further includes elements inherent to such process, method or device. In the absence of more limitations, an element defined by "include a . . . " does not exclude other same elements existing in the process, method or device including the element.

It should be further noted that orientations or positional relationships indicated by terms, such as "center", "upper", "lower", "left", "right", "vertical", "horizontal", "inner", "outer" and the like are based on orientations or positional relationships shown in the drawings, are to facilitate the description of the present application and simplify the description merely, do not indicate or imply that the referred apparatuses or elements must have specific orientations and are constructed and operated in the specific orientations and thus should not be construed to limit the present application. Unless otherwise clearly specified and defined, the terms "mount", "interconnect" and "connect" should be understood in their broad sense. For example, the terms may be "fixedly connect", "detachably connect" or "integrally connect"; "mechanically connect" and "electrically connect"; or "directly interconnect", "indirectly interconnect through an intermediate" or "the communication between the interiors of two elements". For those of ordinary skill in the art, the specific meanings of the above terms in the present application may be understood according to specific situations.

Finally, it should be noted that: the above embodiments are merely used for illustrating the technical solutions of the present application, but do not limit them; although the present application has been described in detail with reference to the foregoing examples, those of ordinary skills in the art should understand that: the technical solutions recorded in the foregoing embodiments may still be modified, or some of the technical features therein may be equivalently substituted; however, these modifications or substitutions do not separate the essence of the corresponding technical solutions from the spirit and scope of the technical solutions of the embodiments of the present application.

What is claimed is:

1. A high-temporal-accuracy power glitch fault injection method for a cryptographic chip, being used for a safety test of the cryptographic chip and implemented based on a power glitch fault injection apparatus, the power glitch fault injection apparatus comprising a computer, a high-voltage pulse generator and a circuit board, and the method comprising the following steps:
   setting parameters of the power glitch fault injection apparatus, wherein the parameters specifically comprise:
      a power voltage: controlling the circuit board by the computer to set the power voltage according to a voltage required for the normal operation of a circuit of a cryptographic chip to be tested,
      a power glitch voltage: controlling the high-voltage pulse generator by the computer to set the glitch voltage according to the power voltage, and
      a power glitch length: controlling the high-voltage pulse generator by the computer to set the power glitch length according to the power voltage;
   performing initialized configuration on the cryptographic chip to be tested by the computer, comprising: power-on and plaintext input;
   determining a power glitch fault injection time according to the power glitch voltage and a target instruction, specifically comprising: determining a rise time of a power glitch fault according to the power glitch voltage, determining a peak moment of the power glitch fault according to the target instruction, and taking a difference value between the peak moment of the power glitch fault and the rise time of the power glitch fault as a single power glitch fault injection time;

setting the power glitch fault injection time by the computer, and controlling the high-voltage pulse generator to generate the power glitch fault;

injecting the power glitch fault into the cryptographic chip to be tested, determining whether the injection is an effective injection, recording an incorrect ciphertext generated by the injection as an effective incorrect ciphertext and a result that the injection is the effective injection if the injection is the effective injection, otherwise, skipping recording, wherein the power glitch fault injection comprises: a single power glitch fault injection and a continuous power glitch fault injection;

after completing one fault injection by the power glitch fault injection apparatus, returning to the step of setting the parameters of the power glitch fault injection apparatus, and re-performing power glitch fault injection until preset fault injection times are reached, and obtaining effective incorrect ciphertexts generated when the cryptographic chip to be tested inputs different plaintexts; and analyzing the effective incorrect ciphertexts according to a differential fault analysis algorithm and cracking key information of the cryptographic chip to be tested to complete the safety test of the cryptographic chip;

wherein after performing initialized configuration on the cryptographic chip to be tested by the computer, the method further comprises:

obtaining a correct ciphertext of the cryptographic chip to be tested;

wherein the injecting the power glitch fault into the cryptographic chip to be tested and determining whether the injection is an effective injection specifically comprises:

injecting the power glitch fault into the cryptographic chip to be tested, determining whether the cryptographic chip to be tested outputs an incorrect ciphertext skipping the target instruction, determining the injection is the effective injection if the incorrect ciphertext skipping the target instruction is output, otherwise, the injection is a non-effective injection;

wherein the analyzing the effective incorrect ciphertexts according to the differential fault analysis algorithm and cracking key information of the cryptographic chip to be tested specifically comprises:

calculating a difference set according to a correct ciphertext output by the cryptographic chip to be tested under a certain plaintext and an effective incorrect ciphertext output by the cryptographic chip to be tested under the plaintext;

repeating the above step to obtain all difference sets of the cryptographic chip to be tested under different plaintexts;

calculating an intersection according to all the difference sets; and determining the key information of the cryptographic chip to be tested according to the intersection.

2. The high-temporal-accuracy power glitch fault injection method for the cryptographic chip according to claim 1, wherein determining the injection time of the power glitch fault according to the power glitch voltage and the target instruction during the continuous power glitch fault injection further comprises:

determining a fall time of the power glitch fault according to the power glitch voltage; and summing the rise time of the power glitch fault, the fall time of the power glitch fault and a preset signal delay time to serve as a continuous fault injection cycle.

3. A power glitch fault injection apparatus, for implementing the high-temporal-accuracy power glitch fault injection method for the cryptographic chip according to claim 1, comprising:

the computer, connected to a high-voltage pulse generator, a circuit board and a cryptographic chip to be tested through a serial cable, and configured to control the high-voltage pulse generator to input a power glitch fault, control a power voltage of the circuit board and control the initialization of the cryptographic chip to be tested;

the high-voltage pulse generator, connected to the computer, connected to the cryptographic chip to be tested through a high-voltage cable, and configured to generate the power glitch fault so as to generate the power glitch fault in the cryptographic chip to be tested; and the circuit board, connected to the cryptographic chip to be tested through a high-voltage cable, and configured to provide the power voltage required by the cryptographic chip to be tested.

4. The power glitch fault injection apparatus according to claim 3, further comprising:

an oscilloscope, connected to the computer, connected to the cryptographic chip to be tested through a probe, and configured to detect an electromagnetic signal of the cryptographic chip to be tested, monitor a fault injection time point and detect a waveform fluctuation of the cryptographic chip to be tested so as to preliminarily determine whether fault injection is completed successfully.

* * * * *